Patented Dec. 19, 1922.

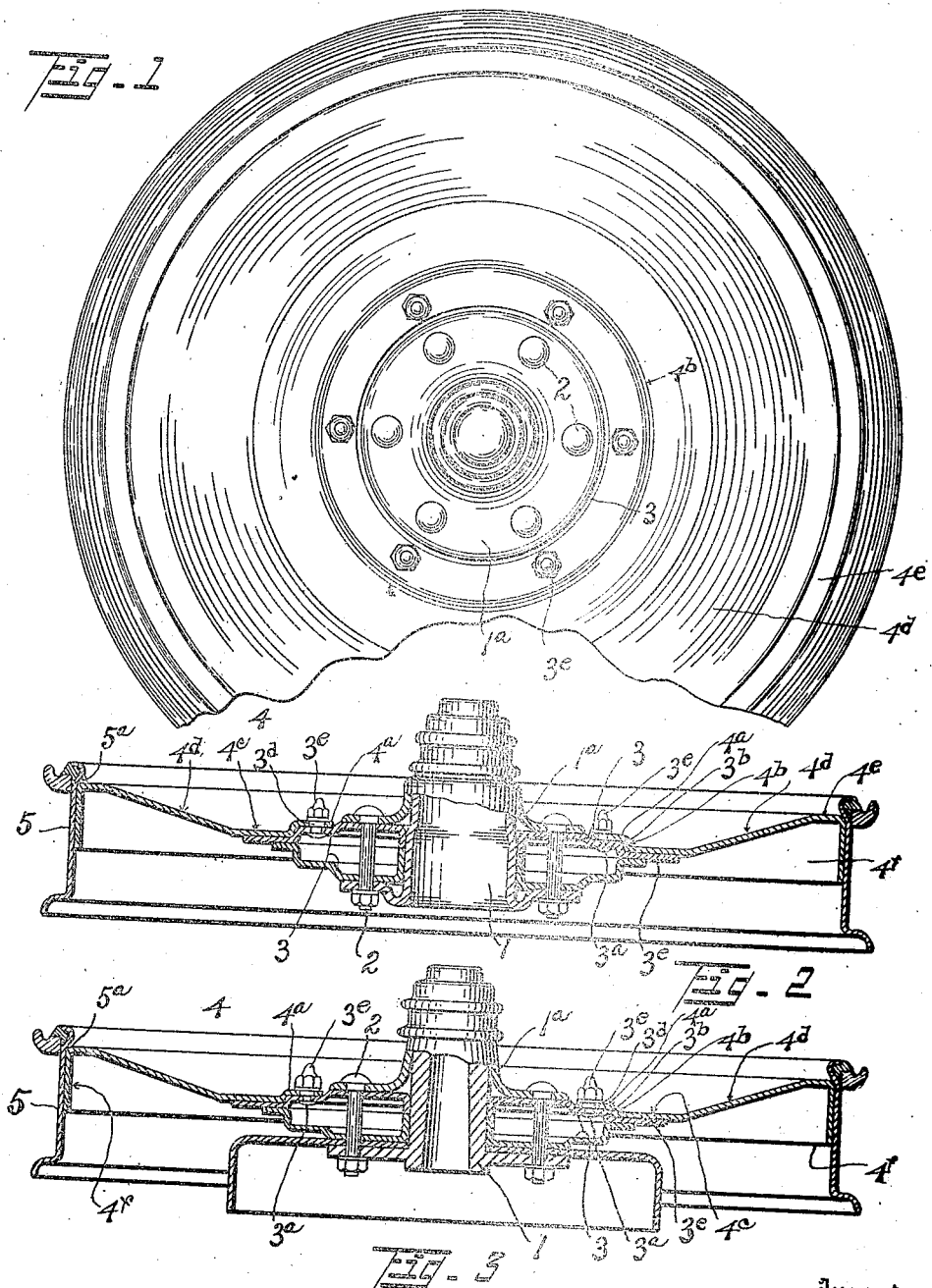

1,439,475

UNITED STATES PATENT OFFICE.

FRED S. LACK, OF PADUCAH, KENTUCKY.

METALLIC VEHICLE WHEEL.

Application filed December 27, 1920. Serial No. 433,293.

*To all whom it may concern:*

Be it known that I, FRED S. LACK, a citizen of the United States, residing at Paducah, in the county of McCracken and State of Kentucky, have invented certain new and useful Improvements in Metallic Vehicle Wheels, of which the following is a specification.

My invention relates to improvements in metallic vehicle wheels, and more particularly to that class or type commonly known as "disc wheels" particularly designed and adapted for use in connection with motor vehicles and being demountable from the hub portions thereof.

The primary object of the invention is to provide a generally improved wheel of this class, which will be exceedingly simple in construction, cheap of manufacture and efficient in use.

A further and very important object is the provision of an improved disc supporting hub or hub filler and wheel disc adapted to be used in connection with the standard hub and rim members of ordinary wooden wheels of the demountable type.

With the above mentioned and other ends in view, the invention consists in the novel construction, arrangement and combination of parts, hereinafter described, illustrated in some of its embodiments in the accompanying drawings and particularly pointed out in the appended claims.

Referring to the drawings, forming a part of this specification, Figure 1 is a side elevation of a disc wheel of the front or steering wheel type constructed in accordance with this invention.

Fig. 2, a central cross sectional view of the same.

Fig. 3, a similar view of a wheel of the rear or driving wheel type.

Similar numerals of reference designate like parts thruout all the figures of the drawings.

The improved disc wheel may be used in connection with any ordinary or conventional form of rim, as for example the ordinary demountable rim (not shown), or a fixed rim, as desired. In the present instance I have shown my improved disc wheel connected to a rim of the quick detachable type.

In applying my improved disc wheel to the ordinary flanged hub 1, I use a hub cap $1^a$, and connecting bolts 2, such as commonly employed in connection with an ordinary wood wheel, and I provide an improved disc supporting hub 3, adapted to fill the space between the flanged portions of the hub and hub cap in lieu of the wooden hub portion of the wheel structure to be replaced.

The improved disc supporting and bracing hub member or filler 3, may be of any suitable and convenient form, being, in the present instance, made up of two annular flanged members suitably connected or welded together, and conjointly forming a hollow hub member connected by the usual connecting bolts 2.

As a means of detachably connecting the improved wheel disc 4, to the supporting hub 3, and particularly as a means of reinforcing and bracing the hub portion of the disc 4, and relieving the attaching elements $3^a$, of any shearing tendency and particularly of radial and lateral stresses while the wheel is in motion, the disc supporting hub 3, is provided with an annular shoulder $3^b$, terminating in a radially extending flange $3^c$, the latter preferably extending approximately along the median longitudinal plane of the wheel body as a whole.

The attaching elements $3^a$, are preferably in the form of stud bolts, as shown, the bolts $3^a$, being preferably provided with enlarged bearing portions $3^d$, to fit into similar shaped openings in the off-set flanged portion $4^a$, of the wheel disc 4, and being adapted to clamp the latter by means of the clamping or cap nut $3^e$.

The improved wheel disc is provided with an annular shoulder $4^b$, corresponding in form to the annular shoulder $3^b$, and adapted to be seated thereon, said wheel disc 4, being further provided with a relatively flat portion $4^c$, clamped against and braced by the annular flange $3^c$, of the hub filler member 3. The disc 4, is provided with an outwardly flaring or dished portion $4^d$, extending outwardly toward the edge of the felly or wheel rim on the face side of the wheel and terminating in a relatively flat annular portion $4^e$, affording, in the present instance, a shoulder to abut against the shoulder portion $5^a$, of the rim 5.

It will be seen that the outwardly inclined or dished portion $4^d$, and relatively flat annular portion $4^e$, terminate in a rim supporting flange or fixed rim $4^f$, said flange or rim $4^f$, extending at right angles to the median longitudinal plane of the wheel body, and, in the present instance, terminating at one side thereof.

The flanged or fixed rim 4', may be welded or otherwise suitably secured within the rim 5, so that the latter will be securely retained thereon.

Having thus described some of the embodiments of my invention, without having attempted to set forth all the forms in which it may be made, or all the modes of its use, what I claim and desire to secure by Letters Patent, is,—

1. In a vehicle wheel, a hollow hub filler made up of two annular flanged members, one of said members being provided with an off-set disc supporting shoulder terminating in a radially extending disc supporting flange.

2. In a vehicle wheel, a hub filler member provided with attaching elements on its face side and having an annular off-set disc supporting shoulder radially spaced outside of said attaching elements and terminating in a radially extending disc supporting flange.

3. In a vehicle wheel, a wheel disc embodying a relatively flat inner hub attaching section provided with an annular off-set shoulder, the latter terminating in a frusto-conical outwardly inclined annular section, said outwardly inclined frusto-conical annular section terminating in an integral rim supporting flange.

4. In a vehicle wheel, a wheel disc embodying a relatively flat hub attaching section surrounded by an annular off-set shoulder terminating in a surrounding relatively flat annular portion, the latter terminating in an outwardly inclined annular portion terminating in an integral fixed rim forming flange.

5. In a metallic disc wheel, a hub member provided with disc attaching elements at one side and having an off-set disc supporting shoulder terminating in a flange portion radially spaced from said shoulder, and a wheel disc having a relatively flat inner section secured at one side of said hub member by said attaching elements, said wheel disc embodying correspondingly shaped shoulder and flange portions abutting against said shoulder and flanged portions, respectively, of said hub member outside of said attaching elements to interlock with each other and relieve said fastening elements of shearing action.

In testimony whereof I have affixed my signature.

FRED S. LACK.